United States Patent [19]

Hornbaker et al.

[11] 4,086,414
[45] Apr. 25, 1978

[54] STEAM STRIPPING POLYVINYL CHLORIDE RESINS

[75] Inventors: Edwin D. Hornbaker; Adam Nugent, Jr.; Cecil P. Loechelt, all of Baton Rouge, La.

[73] Assignee: Ethyl Corporation, Richmond, Va.

[21] Appl. No.: 649,428

[22] Filed: Jan. 15, 1976

Related U.S. Application Data

[63] Continuation-in-part of Ser. No. 498,546, Aug. 19, 1974, abandoned.

[51] Int. Cl.² ............................................... C08F 6/10
[52] U.S. Cl. ................................ 528/500; 159/47 R; 203/88; 203/96; 526/344; 528/501; 528/502
[58] Field of Search ........................ 528/500, 501, 502; 526/344

[56] References Cited

U.S. PATENT DOCUMENTS

| 2,068,424 | 1/1937 | Mark | 526/225 |
|---|---|---|---|
| 2,458,636 | 1/1949 | Plambeck, Jr. | 526/501 |
| 3,052,663 | 9/1962 | Bodlaender | 526/497 |
| 3,475,398 | 10/1969 | Jobard | 526/344 |
| 3,749,685 | 7/1973 | Johnson, Jr. | 528/499 |
| 3,956,249 | 5/1976 | Goodman | 528/500 |

FOREIGN PATENT DOCUMENTS 1,248,943  8/1967  Germany ........................... 526/500

OTHER PUBLICATIONS

Chem. Abst., 80, 146608(c), 1974.

*Primary Examiner*—Christopher A. Henderson, Jr.
*Attorney, Agent, or Firm*—Donald L. Johnson; John F. Sieberth; E. Donald Mays

[57] ABSTRACT

A method for reducing the vinyl chloride monomer content of polyvinyl chloride resins suspended as a slurry in an aqueous medium. The polyvinyl chloride-water slurry as produced in a conventional suspension resin autoclave, or a resin-water slurry prepared subsequent to suspension polymerization, is placed in a vessel and heated to a suitable temperature for removal of vinyl chloride monomer from the resin. In this operation, the polyvinyl chloride-water slurry is agitated in a vessel and steam is injected directly into the slurry to rapidly heat the slurry up to a minimum temperature of at least about 180° F. The slurry is cooled immediately, or optionally it can be maintained for a period of time at the selected maximum temperature and then rapidly cooled by applying vacuum to the vessel and condensing the vapor phase removed from the vessel. Dried polyvinyl chloride resin produced by this process has been found to have a vinyl chloride monomer content below a detectable limit of 0.5 ppm.

8 Claims, 1 Drawing Figure

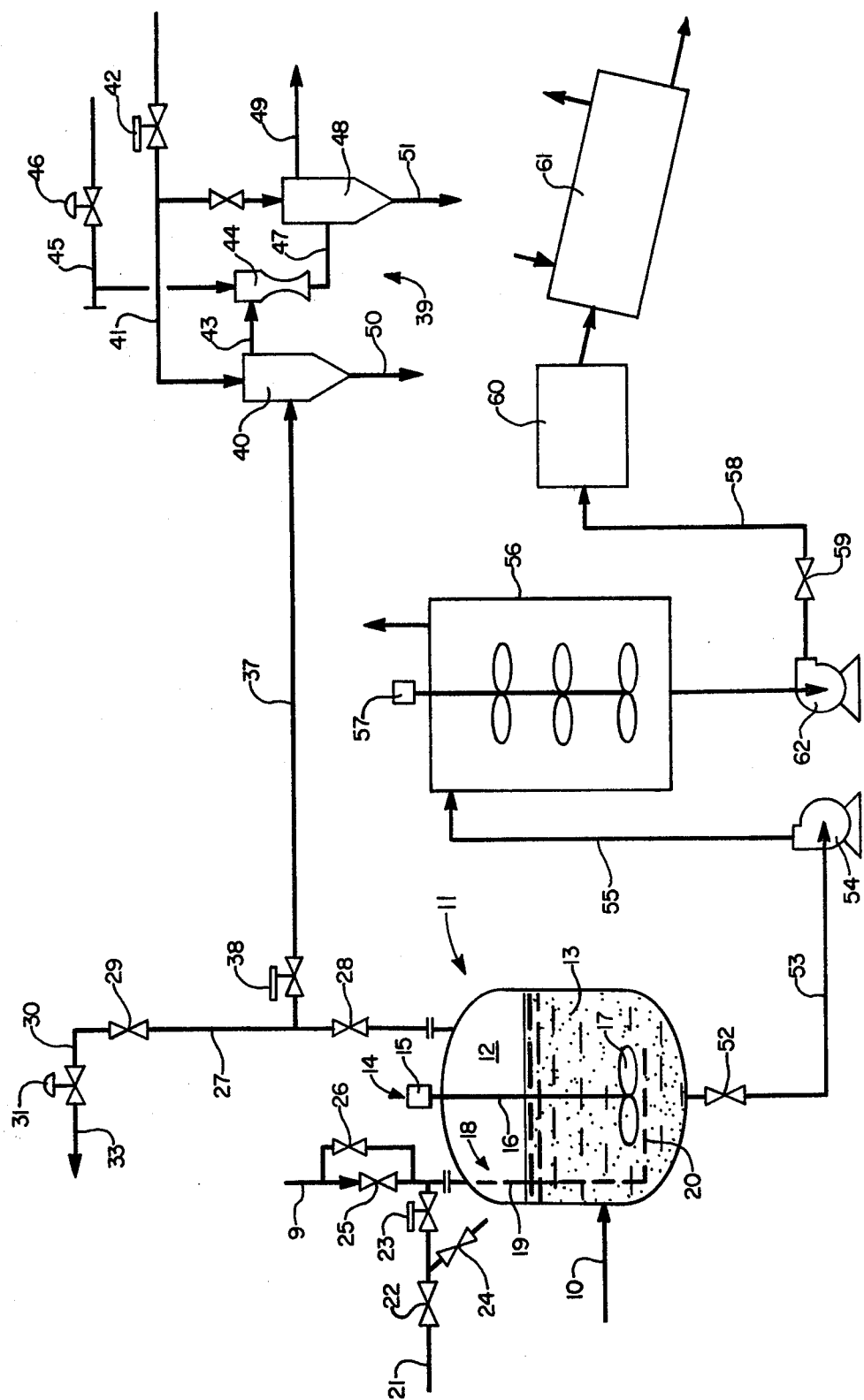

STEAM STRIPPING POLYVINYL CHLORIDE RESINS

CROSS REFERENCE TO RELATED APPLICATION

This application is a continuation-in-part of Ser. No. 498,546, filed Aug. 19, 1974, now abandoned.

BACKGROUND OF THE INVENTION

This invention relates to a method for treating polyvinyl chloride resins to reduce the vinyl chloride monomer content thereof.

In conventional processes for producing polyvinyl chloride resins, the unreacted vinyl chloride monomer (VCM) is removed from the resin in a number of different steps in the finishing process. In the suspension process, a large portion of the unreacted vinyl chloride monomer may be removed by evacuating the polymerization autoclave to adiabatically flash the unreacted monomer. Alternatively, the suspension resin-monomer-water slurry produced in an autoclave may be transferred to a degassing vessel and vacuum applied to adiabatically flash the monomer which is then condensed or otherwise recovered. Further reductions of the monomer content of the resin-water slurry can occur in vented holding or staging tanks wherein the product from the autoclave or other source is held for some period of time prior to further processing. The vinyl chloride monomer content is significantly lowered in the final dried PVC resin product during the drying step. The PVC slurry is separated into aqueous and wet solid components by conventional means such as centrifuging and/or filtering. The wet solids are then dried by conventional means such as a rotary dryer or a dryer which blows heated air through the resin particles as they are conveyed through a closed system or while they are contained in a drying vessel. Conventional suspension polyvinyl chloride resins dried according to the foregoing conventional procedures have been found to contain, for example, from about 25 parts per million to about 4,000 parts per million vinyl chloride monomer in the final dried resin product, depending upon the particle characteristics of the particular resin produced.

Recently the vinyl chloride monomer content of polyvinyl chloride resins has become a matter of great concern to the public, the government, and the industrial producers of these resins. Governmental agencies are proposing maximum levels of vinyl chloride monomer in air surrounding polyvinyl chloride production facilities. Regulations are also proposed for limiting the emission of vinyl chloride monomer to the atmosphere. Additionally, standards for maximum levels of vinyl chloride monomer extracted from PVC containers such as bottles or jars used to package food or cosmetic products are anticipated.

In view of the foregoing, it is seen that there is a pressing need for a process for both reducing the vinyl chloride monomer emissions from suspension polyvinyl chloride plants and also the vinyl chloride monomer content of the PVC suspension resins which are produced by these plants.

In copending patent application Ser. No. 498,547, filed Aug. 19, 1974, and entitled "Treating Polyvinyl Chloride Resins" (assigned to the same assignee as this application), now abandoned, there is disclosed a process for reducing the vinyl chloride monomer content of suspension PVC resins. The process of the aforementioned application involves heating an agitated PVC resin-water slurry in a closed vessel to a temperature of at least about 50° C while applying vacuum to the vessel for a period of time sufficient to reduce the vinyl chloride monomer content of the resin and then cooling the slurry. The vacuum stripped slurry is then dewatered and dried. This process suffers a disadvantage in that it requires a considerable amount of time to achieve a reasonable reduction in the vinyl chloride monomer content of the resin. Further, the process does not achieve as great a reduction as is desired in the vinyl chloride monomer content of the types of suspension PVC resins that are utilized in producing PVC compounds used for manufacture of containers, such as blow molded bottles, employed for packaging food, drug or cosmetic products. The process of the present invention overcomes the aforementioned disadvantages in that it achieves a more efficient removal of vinyl chloride monomer from the suspension PVC resin in a much shorter period of time.

Heretofore, it had been generally assumed that PVC suspension resins could not be subjected to temperatures approaching their glass transition temperature without resulting in a degradation in the quality of the PVC resin. Surprisingly, the process of the present invention wherein the PVC resin may be heated to temperatures in excess of its glass transition temperature does not produce any significant deterioration in the quality of the PVC resins. In fact, some types of PVC resins appear to have improved qualities after being subjected to the steam stripping process of the present invention.

SUMMARY OF THE INVENTION

It is an object of the present invention to provide a method for producing suspension polyvinyl chloride resins containing a very low content of vinyl chloride monomer.

It is a further object of the present invention to provide a process for producing suspension polyvinyl chloride resins which results in a low loss of vinyl chloride monomer to the atmosphere.

It is a still further object of the present invention to provide a process for reducing the vinyl chloride monomer content in the suspension polyvinyl chloride resins, which process is efficient, economical and readily integrated into the conventional processing system of polyvinyl chloride resin manufacture.

One of the preferred process aspects of the present invention may be carried out by transferring the polyvinyl chloride-water slurry from the polymerization autoclave or other source to a stripping vessel equipped with a stirrer and a steam sparging device. The slurry is agitated in the vessel, and steam is injected through the sparger increasing the temperature of the slurry to at least about 180° F. The steam feed is then terminated after the preselected maximum temperature is reached, vacuum is applied to the vapor space of the vessel, and the water vapor is applied to the vapor space of the vessel, and the water vapor is adiabatically flashed to rapidly cool the PVC-water slurry back to a temperature of from 120° F to 170° F. The slurry is then dewatered and dried to produce a polyvinyl chloride resin having a reduced vinyl chloride monomer content of from below a detectable limit (less than 0.5 ppm) to about 300 ppm in the dried resin, depending on the particle characteristics of the particular PVC resin and the conditions of time and temperature involved.

The apparatus aspects of the invention may be carried out by utilizing a closed vessel (which may be the autoclave in which the resin is prepared) that is equipped with an agitator and suitable drive means. A steam sparger device is located in the lower portion of the vessel for injecting steam into the slurry. Vacuum and condensing equipment are connected to the vapor space of the vessel for flash cooling the vessel contents after heat-up. Facilities are provided for transferring the treated polyvinyl chloride-water slurry to a suitable separator device, e.g., centrifuge, and subsequently transferring the dewatered resin to a suitable drying device, e.g., a rotary dryer.

BRIEF DESCRIPTION OF THE DRAWING

The drawing is a schematic diagram of an apparatus suitable for carrying out the process of the present invention and for producing a suspension polyvinyl chloride resin having a low vinyl chloride monomer content.

DESCRIPTION OF THE PREFERRED EMBODIMENTS

The invention broadly comprises heating an aqueous suspension mixture of suspension PVC resin particles which have been subjected previously to the conventional adiabatic flash or venting off of unreacted vinyl chloride monomer to an elevated temperature at which the diffusion of vinyl chloride (VCl) monomer inside the resin particles is substantially higher than the rate at the lower temperatures normally used for the venting or flashing of vinyl chloride from such slurries. At this elevated temperature, vinyl chloride monomer rapidly diffuses to the surface of the resin particle and then to the surrounding aqueous medium. During the heating operation, vapor is removed from the vessel containing the aqueous suspension mixture at a rate to maintain the vessel pressure below the saturation pressure of the aqueous suspension mixture, thus flashing off a vapor from the liquid phase containing both vinyl chloride and water. Utilization of appropriate heating rates, vessel pressures and terminal temperature permits the efficient removal of vinyl chloride monomer from the aqueous suspension mixture without producing adverse effects on the properties of the finished dried polyvinyl chloride resin product. It is well known that prolonged exposure of polyvinyl chloride resins to excessive temperatures will produce thermal degradation of the resin which will render it unsuitable for commercial use. Quite unexpectedly, it has been found that it is possible to rapidly heat aqueous suspension mixtures of polyvinyl chloride resins to quite high temperatures for a sufficient period of time to significantly reduce the vinyl chloride monomer content of the resin particles without adversely deteriorating the quality of the finished resin particles.

The process of the present invention may be carried out on the polyvinyl chloride-water suspension that is normally produced in a commercial polyvinyl chloride suspension autoclave. The resin-water slurry is placed in a suitable vessel and agitated, and heat is applied to the slurry in the vessel by injecting steam into the slurry. Preferably, the agitated suspension may be heated by injecting steam therein until the temperature of the resin-water suspension reaches at least the saturation temperature of pure water corresponding to the selected pressure, optionally holding the slurry at that temperature for a specific period of time, and then rapidly cooling the slurry to a temperature at which little or no degradation of the PVC resin occurs. Any suitable method of cooling the slurry can be utilized, e.g., cooling coils in the vessel, jacket cooling, injecting cooling water into the slurry, etc. However, the preferred method of cooling the slurry is to apply a vacuum to the vapor space of the vessel to adiabatically flash a portion of the aqueous phase.

Customarily, polyvinyl chloride suspension resins are produced in a number of grades which are suited for particular end use in fabricating into finished products. Customarily, these resins are classified into grades primarily according to the average molecular weight of the suspension resin. The particles of resin in each of these different grades or types are characterized by having a porosity which is slightly different from adjacent types or grades. The lower molecular weight resins, in general, have a lower porosity than do the higher molecular weight resins. It has been found that the porosity of the resin particles is directly related to the ease with which vinyl chloride monomer occluded in the resin particles can be removed therefrom. Surprisingly, the present invention permits the adjustment of heating temperature and heating time so that it is now possible to accomplish removal of essentially all of the vinyl chloride monomer without producing a noticeable densification (loss of porosity) of the finished resin particles, despite the fact that the resin is heated above its glass transition temperature (i.e., the temperature at which softening begins to occur). Quite unexpectedly, it has been found that in the practice of this invention the polyvinyl chloride-water slurry can be heated to a temperature as high as 225° F which is well above the glass transition temperature of polyvinyl chloride resins, without producing significant densification in the PVC particles, yet permitting a rapid and many-fold reduction in the vinyl chloride monomer content in the finished resin particles. It has also been found, quite unexpectedly, that PVC resins that have been treated by the present process do not suffer any appreciable deterioration in heat stability, i.e., early color or reduced dynamic thermal stability.

The polyvinyl chloride resins which can be treated by the process of the present invention include all of the polyvinyl chloride polymers which are composed predominantly of polymerized vinyl chloride. Thus, there may be utilized the homopolymers of vinyl chloride and the multicomponent copolymers or interpolymers made from monomeric mixtures containing vinyl chloride, together with lesser amounts of other copolymerizable mono-olefinic materials. Exemplary of some of the mono-olefinic materials which may be interpolymerized with vinyl chloride include the vinylidene halides, such as vinylidene chloride and vinylidene bromide; vinyl esters, such as vinyl acetate, vinyl propionate, vinyl butyrate; acrylic and alpha-alkyl acrylic acids and their alkyl esters, their amides and their nitriles; vinyl aromatic compounds, such as styrene, dichlorostyrene; alkyl esters of maleic and fumaric acid, such as dimethyl maleate and diethyl maleate; vinyl alkyl ethers, such as vinyl methyl ether, vinyl ethyl ether; alpha-olefins, such as ethylene and propylene, and other readily polymerizable compounds containing a single olefinic double bond, especially those containing the $CH_2=C<$ group.

The polyvinyl chloride resins which may be treated by the method of this invention are those which are produced by a suspension process, e.g., those produced by polymerizing in an aqueous medium containing a protecting colloid or other surface active agent in order to obtain an aqueous suspension of the polymer in the form of fine grains or particles. Since procedures and formulations for preparing suspension PVC resins are well known to those skilled in the art, it is not believed necessary to detail such preparation procedures herein.

In the process of the present invention, the stripping operation is carried out by injecting steam into an agitated resin-water slurry in a closed vessel and rapidly heating the resin-water suspension to the saturation temperature of pure water corresponding to the selected operating pressure (e.g., at least about 212° F when operating at atmospheric pressure). In general, temperatures in the range of from about 180° F to about 240° F are satisfactory. Steam injection may be continued for a period of time subsequent to reaching the saturation temperature to accomplish reduction in residual vinyl chloride monomer content. Generally, the steam feed rate is reduced to hold the resin-water slurry at the selected temperature for a period of time of from about 2 minutes to about 20 minutes. The slurry is then quickly cooled by applying a high vacuum to the vapor space of the vessel for a period of time sufficient to reduce the temperature to a range of about 120° to 170° F. The foregoing process produces polyvinyl chloride resin particles when dried having a vinyl chloride monomer content of from below the detectable limit of less than 0.5 ppm to about 100 ppm, depending on the conditions utilized and the particular type of PVC resin treated.

In an alternate procedure, the steam injection rate can be controlled to heat the resin-water slurry to any preselected temperature in the range of from about 180° F to about 212° F at atmospheric pressure after which vacuum is applied to cool down the resin-water slurry. If desired, the steam injection can be continued for a period of time at the preselected maximum temperature before starting the vacuum cooling of the resin-water slurry.

Generally, steam injection is applied to the treating vessel for about 5 minutes to about 45 minutes, preferably from about 15 to 35 minutes, to achieve the desired maximum stripping temperature. The pressure of the steam used may vary from about 100 psig to about 170 psig, preferably from about 120 to 150 psig. A most preferred steam pressure is about 135 psig. With steam in the above pressure ranges, it is preferred to feed the steam to the vessel at a rate of about 0.4 pound to about 0.6 pound of steam per pound of polyvinyl chloride resin contained in the stripping vessel.

Referring now to the drawing, there is depicted an apparatus suitable for carrying out a preferred mode of the process of the present invention. The suspension polymerization of polyvinyl chloride monomer is carried out in a conventional jacketed, stirred autoclave (not shown) to the desired degree of completion. At the end of the polymerization cycle, the polyvinyl chloride-water slurry is transferred through line 10 to the treating vessel, designated generally by the numeral 11. In the case where alternate polymerization processes are used, e.g., bulk polymerization, the PVC from the reactor is slurried with water prior to transfer to the treating vessel. Treating vessel 11 may be any suitable size to receive the PVC resin-water slurry from the autoclave or other source and still provide a head or vapor space 12 above the resin-water suspension 13. The treating vessel is equipped with an agitator assembly, designated generally by the numeral 14. The agitator assembly includes a drive unit 15, a shaft 16 within the tank extending adjacent to the bottom of the tank. The shaft may be equipped with any number of stirring blades or paddles 17. The treating vessel is equipped with a steam sparger unit, designated generally by the numeral 18, which includes a vertical supply line 19 extending from the exterior of the vessel to a point adjacent the bottom of the vessel. Vertical supply line 19 is connected at its lower end to a transversely or horizontally extending sparging line or lines 20. Sparger line 20 may be a continuous loop of pipe with suitable small holes drilled therein for exit of the steam. Alternatively, the sparger line may consist of two or more branches extending outwardly from the vertical supply line in any particular configuration which provides uniform steam distribution into the lower portion of the vessel, yet which does not interfere with the operation of the agitator blades 17. The sizes of the steam supply line 19 and sparger line 20 can be readily determined and fitted to the volume of the resin-water slurry normally contained in the vessel to adequately heat the slurry at a suitable rate. Additionally, the number of holes and their sizes can be adjusted in sparger line 20 to provide adequate distribution and flow rate for the steam to the treating vessel. If desired, vertical supply line 19 can be insulated from its entrance point at the top of the vessel to a point well below the normal liquid level in order to minimize overheating of the resin-water slurry at the vapor-liquid interface.

Steam is supplied to sparger unit 18 through line 21 equipped with block valve 23 and flow control valve 22. Blowdown valve 24 is provided to remove any condensate from steam line 21 which accumulates between stripping or treating operations. Water can be supplied to sparger unit 18 through line 9 containing block valve 25 and bypass valve 26 for flushing the steam sparger unit with water.

Vapor line 27 is connected at its lower end to vapor space 12 in the top of the treating vessel 11 and contains block valves 28 and 29. Vapor line 27 is connected at its upper end to control valve 31. Line 33 extends to a gas holder (not shown) or any other suitable vessel or apparatus for recovering the major portion of the residual vinyl chloride monomer remaining in the slurry as it is dumped from the autoclave.

A second vapor line 37 is connected to vapor line 27 from the treating vessel through control valve 38 to permit flow of vapor to the condenser vacuum system, designated generally by the numeral 39. The condenser vacuum system 39 includes a direct contact condenser 40 which is supplied with a spray of cooling water through cooling water supply line 41 having a flow control valve 42 therein. Condenser 40 is connected by vacuum line 43 to steam vacuum jet 44. Steam line 45 supplies steam to vacuum jet 44, and the flow is controlled by means of control valve 46. Exhaust line 47 connects steam vacuum jet 44 to the after condenser 48. The after condenser vapor line 49 may be connected to suitable means (not shown) for condensing or otherwise disposing or recovering of the vapor from this source. Condensate line 50 connects the direct contact condenser to suitable disposal, treating or recovery facilities for handling the vinyl chloride monomer contained in this condensate stream. Condensate line 51 is connected to the after condenser and carries the condensate from this source to suitable disposal facilities.

Block valve 52 in the bottom of treating vessel 11 connects to dump line 53 which carries the resin-water slurry to slurry transfer pump 54. Discharge line 55 connects slurry pump 54 to slurry holding tank 56. Slurry holding tank 56 is equipped with an agitator unit 57 to maintain the resin in suspension in the aqueous phase in the tank. Slurry transfer line 58 is equipped with control valve 59 and conveys the resin-water slurry by means of slurry transfer pump 62 to a suitable dewatering apparatus, for example, a centrifuge 60. The wet resin cake is transferred from the centrifuge to a suitable drying apparatus, for example, a hot air rotary dryer 61. The dired finished resin from the exit of dryer 61 is conveyed by suitable means to storage and/or other processing facilities (not shown).

A preferred mode of carrying out the process of the present invention will now be described with reference to the drawing. Prior to receiving the resin-water slurry charge from the autoclave (not shown) or intermediate slurrying apparatus, the treating vessel 11 is evacuated to about 24 inches of mercury vacuum as left by the previous cycle. At the end of the polymerization cycle in the autoclave, the autoclave block valve (not shown) is opened, and the polyvinyl chloride-resin slurry is transferred to the treating vessel 11. As the pressure in the treating vessel approaches or reaches atmospheric, valves 28, 29 and 31 are opened to provide flow from vapor space 12 in the vessel 11 through lines 27 and 33 to the gas holder (not shown) or other suitable vinyl chloride monomer recovery facilities. The proceding steps are the conventional venting and flashing steps customarily used to remove the major portion of the unreacted VCM from the resin-water slurry. After the resin-water slurry is transferred to treating vessel 11, the block valve in line 10 is closed. Valve 25 in purge water supply line 9 is then opened in order to flush the steam sparger unit 18 with clear water. After flushing with water, valve 25 is closed, steam dump valve 24 is opened, and flow control valve 22 is opened in the steam line to purge the condensate from this line. After purging the condensate line, valve 24 is closed and block valve 23 is opened. Flow control valve 22 is set to supply steam to sparger unit 18 at a predetermined rate. The rate of steam flow to sparger unit 18 will be dependent upon the pressure of the steam used, the size of the treating vessel and the volume of resin-water slurry contained in the vessel. While the heat-up rate is not critical, it is desirable to heat the resin-water slurry as rapidly as possible. It has been found desirable to use a heating rate of about 4° to 6° F per minutes. The agitator is operated at a suitable rpm to maintain good mixing of the PVC resin-water slurry in the tank from the time the autoclave is discharged to the tank through the completion of the stripping, cool back, and discharge steps. The maximum temperature to which the resin-water slurry is heated will be dependent upon the particular type of polyvinyl chloride resin being steam treated. In general, it has been found that satisfactory vinyl chloride monomer removal can be effected by heating the PVC resin-water slurry to a temperature of at least about 180° F or more, preferably from about 212° F up to a maximum of about 240° F, depending upon the type of resin undergoing treatment and the operating pressure of the treating vessel.

If it is desired to subject the slurry to a temperature in excess of 212° F, this can be expeditiously accomplished by controlling the back pressure on the vinyl chloride monomer recovery facilities connected to line 33, or, alternatively, by limiting the flow through vapor line 27 from the treating vessel by controlling first control valve 31 to exert a suitable back pressure on vapor space 12 in the treating vessel, thereby raising the boiling point of the resin-water slurry to the desired temperature.

After the desired maximum temperature is reached in the resin-water slurry in treating vessel 11, steam treatment may be continued at the selected maximum temperature for the desired period of time. However, as shown in Examples 23–32, extremely efficient removal of vinyl chloride monomer from the resin-water slurry in the treating vessel can be accomplished by merely subjecting the resin-water slurry to the desired temperature and immediately beginning the cool back procedure to bring the contents down to the desired temperature for transfer to the slurry holding tank. Termination of the steam heating on achieving the selected maximum temperature is generally preferred since this results in exposing the polyvinyl chloride resin particles to the maximum temperature for the shortest period of time. However, holding the slurry at the preselected maximum temperature for a period of time may be necessary to achieve the desired reduction in vinyl chloride monomer content, particularly for those PVC resins having a low porosity. In a preferred mode of operation, as soon as the predetermined maximum temperature is reached in slurry treating vessel 11, steam valve 23 is immediately closed and simultaneously, or as soon thereafter as practicable, control valve 31 in vapor extension line 33 is also closed. Valve 38 in vapor stripping line 37 is then opened, and the pressure in vapor space 12 of the treating vessel is immediately reduced to below atmospheric by means of condenser vacuum system 39. During the cool back step of the process, the boiling point of the resin-water suspension in treating vessel 11 is reduced by the vacuum condenser system to rapidly cool the contents of the resin-water slurry by adiabatic flashing of water vapor from the resin-water slurry. While the removal of the major portion of the vinyl chloride monomer present in the resin-water slurry as received from the autoclave or other source is accomplished during the heat-up step, preferably using steam stripping, nevertheless, significant quantities of vinyl chloride monomer are removed during the cool back step by utilizing the adiabatic flash employed in the present process. Adiabatic flashing of the water from the resin-water slurry is continued in stripping vessel 11 until the resin-water suspension reaches a temperature of about 120° F to about 170° F, depending upon the particular type of resin being treated. When the resin-water slurry reaches the desired temperature, dump valve 52 in dump line 53 is opened, and pump 54 is actuated to begin removal of the resin slurry from the treating vessel to slurry holding tank 56 through line 55. During this transfer time, flash or adiabatic cooling of the contents of the treating vessel is continued throughout the transfer period until the liquid level reaches the bottom of treating vessel 11. Generally, the temperature of the resin-water slurry will drop about 20° F during the time required for transferring the contents of the treating vessel to the slurry holding tank. After the transfer of the resin-water slurry from the treating vessel, block valve 52 on the bottom of the vessel is closed, pump 54 is stopped, and valve 38 connecting the vessel to the condenser vacuum system is also closed. Treating vessel 11 is then ready to receive the next batch.

One or more batches of steam treated resin-water slurry are collected in slurry holding tank 56 and then transferred by pump 62 through slurry transfer line 58 regulated by means of control valve 59 into centrifuge 60, or other dewatering device, to separate the aqueous and resin phases. The wet cake from the dewatering device or centrifuge 60 is then fed to a suitable drying device, for example, a rotary dryer 61, to dry the resin to the desired water content. The dried finished resin is then transferred by conventional means to suitable storage silos or to bagging or, if desired, directly to a polyvinyl chloride compounding line for addition of conventional additives to prepare specialty PVC compounds.

The following examples will illustrate specific embodiments of the invention and the details employed in the practice of the invention. The examples should not be construed as limiting the invention. In the examples, parts and percentages are by weight and are corrected to a dry resin basis unless otherwise indicated.

The stripping tests performed and documented in the following examples were carried out using suspension homopolymer polyvinyl chloride resins prepared according to the standard recipes of Ethyl Corporation for its commercial resins. These commercial resins are identified by the following Ethyl designation numbers: SM-160, SM-185, SF-225 and SM-250. These resins have relative viscosities as measured in cyclohexanone using 0.94 grams of PVC and 100 ml of cyclohexane at 25° C as follows: SM-160, 1.60; SM-185, 1.85; SF-225, 2.25; and SM-250, 2.50. The PVC-water slurries utilized in the following stripping tests were the slurries resulting from the polymerization of vinyl chloride monomer in bench scale, pilot plant or plant size stirred autoclaves. Most of the PVC-water slurries used in the tests had been subjected to conventional vacuum evacuation for removal of a portion of the unreacted vinyl monomer from the slurries prior to being subjected to the stripping tests. The PVC-water slurries used in the following experiments contained from about 28 to about 40 weight percent resin based on the total weight of the resin-water slurry.

The properties of the PVC resins set forth in the following examples were determined by the following analytical procedures:

A. Bulk Density

Determined by conventional means, i.e., by determining the weight of a known volume of resin which has been allowed to flow freely into a container of a given volume.

B. Particle Size Distribution

The fraction (weight percent) of a sample of resin remaining on a series of standard sieves of varying mesh sizes. Distribution is determined by adding a sample of resin to the top sieve of a series of sieves arranged according to decreasing mesh size and subjecting the sieves to a vibratory motion for a fixed period of time. Graphite may be added to the resin sample as a lubricant, if desired.

C. Yellowness Index and Color Slope

Sample resin is prepared in a test formulation by mixing with a stabilizer, a lubricant and, optionally, other additives and milling on a roll mill at a temperature of 350° F. Samples are taken at fixed time intervals and pressed between polished plates until cool. Yellowness index is measured using a Hunter Colormeter D 25. A graph is prepared of the yellowness index versus time. The yellowness index reported in the examples is the value determined for the sample taken at one minute. The color slope is the slope of the plot of yellowness index versus time.

D. Dynamic Thermal Stability (DTS) (Initial Color)

Resin thermal stabilities were measured using a Brabender Plasti-Corder Type REO-6 and a No. 6 roller head manufactured by C. W. Brabender Instruments, Inc. A test formulation is prepared by blending a resin sample with a stabilizer, a lubricant and, optionally, other additives. The formulation is fed to a Plasti-Corder which is set for a fixed rpm and temperature. Samples of uniform size are removed at fixed time intervals and visual observation of initial color is made. Processing of the samples is continued until there is an abrupt increase in torque. The DTS is the time increment from fusion until the increase in torque.

E. Planetary Dry-Up

A fixed quantity of resin and plasticizer are added to a Brabender-Plasti-Corder equipped with a planetary chamber at a fixed temperature and rpm. The time for complete absorption of the plasticizer which is the planetary dry-up time is determined by measuring the time interval until an abrupt change in torque occurs.

F. Vinyl Chloride Monomer in Polyvinyl Chloride

Instruments

1. Gas Chromatograph
Varian 1740 or equivalent equipped with dual flame ionization detectors. Columns: 16 feet by ⅛ inch thin wall (0.012 in.) stainless steel tubing packed with 16.7 percent 1,2,3,tris(2-cyanoethyl)propane (TCEP), on Chromosorb W. AW, 70/80 mesh. Columns are to be arranged for on-column injection.

2. Strip Chart Recorder
0 – 1 millivolt full scale
1 inch per minute chart speed Procedure 1. Standard Solution: Fill to the mark a 1000 ml volumetric flask with tetrahydrofuran (THF) and add to it exactly 40 microliters of ethyl bromide. This provides a 65 ppm solution of ethyl bromide.

2. Weight exactly 2.50 g of PVC sample into an Erlenmeyer flask and pipette 50 ml of standard solution into the same flask. Add a stirring bar, cover with a cap, and magnetically stir the mixture until the sample is dissolved or gives a homogeneous suspension.

3. Inject 5 microliters of solution into the gas chromatograph under the following conditions:
Injection Temp.: 100° C
Detector Temp.: 250° C
Oven Temp.: 75° C
Helium Flow: 40 cc/min. (60 lb)
Electrometer Range: $10^{-11}$ amps/mv
Attenuator: 2

4. The attenuation may need switching from sample to sample in an effort to keep the vinyl chloride peak and ethyl bromide peak on scale. If at any time, the peaks exceed the limit of the chart paper, the sample must be rerun.

5. After the peaks of interest are collected, the analyst must wait for complete elution of THF solvent before the next sample is injected.

6. At the end of a series of samples, elevate oven temperature to 150° C for approximately one hour.

7. Measure the areas of the peaks representing vinyl chloride and ethyl bromide and calculate the ppm vinyl chloride using the following arithmetic:

$$(Av/As) \times 0.388 \times 65 \times 17.6 = C$$

$Av$ = Area of vinyl chloride peak
$As$ = Area of ethyl bromide peak
$C$ = ppm, by weight, of vinyl chloride in the sample.

Precision and Accuracy tests, it can be seen that by steam stripping the resin-water slurries at 100° C at atmospheric pressure for from 5 to 20 minutes, the vinyl chloride monomer content in the PVC resin can be reduced to the range of 8.5 to <2 ppm after drying. The detection limit of the analytical method at the time of these analyses was 2 ppm. The tests also indicate in comparison of Examples 2 and 6 that the bulk density of the resin is not appreciably increased by subjecting the resin to the steam stripping operation. Further, the dry-up time, which is an indication of the porosity or absorbtivity of the resin, was not greatly increased.

TABLE I

PVC (SM-185) SLURRY STEAM STRIPPING TESTS

| Example No. | Sample Identif. | Type of Stripping & Pressure | Stripping Time | Stripping Temp. | VCl in PVC[a] ppm | Initial Color[c] | Dry-up[b] | Bulk Dens. g/cc | Remarks |
|---|---|---|---|---|---|---|---|---|---|
| 1 | R-1226 | Unstripped | — | — | 2100 | OK | — | — | — |
| 2 | R-1228 | Unstripped | — | — | 3500 | OK | 11.8 | 0.56 | 0.41% Volatiles after drying. |
| 3 | R-1226 | Steam/Atm. | 15 min. | 100° C | 2.0 | OK | — | — | — |
| 4 | R-1228 | Steam/Atm. | 5 min. | 100° C | 7.1 | — | — | — | Total time in bath - 15 min. |
| 5 | R-1228 | Steam/Atm. | 10 min. | 100° C | 8.5 | — | — | — | Total time in bath - 24 min. |
| 6 | R-1228 | Steam/Atm. | 15 min. | 100° C | 5.2 | — | 15.0 | 0.58 | 0.14% Volatiles after drying. Total time in bath - 20 min. |
| 7 | R-1228 | Steam/Atm. | 20 min. | 100° C | 2.0 | OK | — | — | Total time in bath - 34 min. |

[a]Vinyl chloride monomer in PVC after centrifuging and drying at 60° C for 1.25 hours.
[b]Planetary dry-up, min.
[c]Initial color of PVC compound formulation.

The precision and accuracy of the method has been shown to be ±10–20 percent relative at the 1 ppm level with a lower limit of detection of 0.5 ppm.

EXAMPLES 1–7 stripping

PVC (SM-185) resin-water slurry was prepared by polymerization in a pilot plant autoclave in two runs identified as R-1228 and R-1226 in Table I. The vinyl chloride monomer content of the resin-water slurry of each of these runs was determined prior to conducting the steam striping operation. Four separate sample portions of the PVC-water slurry from polymerization R-1228 were subjected to separate steam stripping in a 2-liter resin flask which was immersed in a water bath for cooling the slurry back to room temperature after performance of the steam stripping operation. One sample of the resin-water slurry from pilot plant sample R-1226 was steam stripped using the same equipment as above for sample R-1228. The conditions for steam stripping and the stripping time and temperatures, together with the vinyl chloride monomer content in the stripped resin (after drying), plus other data determined on the resin samples, are set forth in Table I. Steam at about atmospheric pressure was injected below the surface of the resin-water slurry in the resin flask which was at atmospheric pressure to heat the samples for the time indicated at 100° C. Vinyl chloride monomer in the dried resin from the unstripped slurry and in the stripped resin after drying was determined by the gas chromatographic technique set forth above. From these The foregoing experiments indicate that the process of the present invention is eminently suitable for treating PVC resins to reduce their vinyl chloride monomer content to near the detectable limit (2 ppm), thus making them suitable for use in preparing compounds for manufacturing films, bottles or other containers for packaging food, drug or cosmetic products.

EXAMPLES 8–13

One PVC resin-water slurry sample of Ethyl PVC SM-160 was obtained from a polymerization autoclave in a commercial plant operation during a routine run. Additionally, another PVC resin-water slurry of Ethyl PVC SM-160 was obtained from a single run made in a pilot plant autoclave. Vinyl chloride monomer in the slurries was determined before stripping operations were undertaken in a 2-liter stirred resin flask used for the stripping tests. These samples of the pilot plant slurry were steam stripped at atmospheric pressure for varying lengths of time. One sample of the plant slurry was steam stripped at atmospheric pressure for 30 minutes. The results of the analyses and tests on the samples of Examples 8–13 are set forth in Table II. From the foregoing data, it can be seen that under the drying conditions used in order to obtain maximum removal of vinyl chloride monomer from SM-160 resin, it could be steam stripped at 100° C at atmospheric pressure for at least 20 minutes.

TABLE II

PVC SLURRY STEAM STRIPPING TESTS

| Example No. | Resin | Stripping Temp., ° C | Stripping Time, min. | VCl in PVC, ppm[a] Before Drying | VCl in PVC, ppm[a] After Drying | Initial[b] Color | DTS,[b] min. | Bulk Density g/cc |
|---|---|---|---|---|---|---|---|---|
| 8 | SM-160[c] Control | — | — | 4200 | 3500 | OK | 14.0 | — |
| 9 | SM-160 | 100 | 15 | 32.0 | 20.0 | — | — | — |
| 10 | SM-160 | 100 | 20 | 9.0 | 7.7 | — | — | — |

TABLE II-continued

PVC SLURRY STEAM STRIPPING TESTS

| Example No. | Resin | Stripping Temp., °C | Stripping Time, min. | VCl in PVC, ppm[a] Before Drying | VCl in PVC, ppm[a] After Drying | Initial[b] Color | DTS,[b] min. | Bulk Density g/cc |
|---|---|---|---|---|---|---|---|---|
| 11 | SM-160 | 100 | 25 | 16.0 | — | OK | 13.0 | — |
| 12 | SM-160[d] Control | — | — | 6100 | 4400 | — | — | 0.54 |
| 13 | SM-160 | 100 | 30 | 67 | 48 | — | — | 0.57 |

[a]After each test, slurry was centrifuged, then dried at 60° C for 1.25 hours. VCl content was determined in some cases on wet stripped samples and in all cases on dry resins.
[b]Variations in initial color and dynamic thermal stabilities were determined on the Brabender.
[c]Plant resin slurry.
[d]Pilot plant resin slurry.

EXAMPLES 14–19

Additional steam stripping studies were carried out in a 200-gallon pilot plant autoclave, and, in one instance, in a 300-gallon slurry tank. These experiments were conducted under conditions which simulated the proposed conditions for utilization in full-scale commercial polyvinyl chloride plants. Heat was applied to the jacket of the autoclave with agitation being maintained, and the temperature of the PVC resin-water slurry was brought to approximately 150° F, which is the average temperature of the PVC resin-water slurry as it is received in the discharge vessel from the plant autoclaves.

Variations in the time interval when live steam was injected into the autoclave below the level of the liquid surface was made to determine the effect of this procedure on vinyl chloride monomer removal. Further determination was made during these runs of the effect of agitation on the stripping efficiency by varying the speed of the stirrer. Aliquot samples of the PVC resin-water slurry were taken from each of the experimental runs at different time intervals during the run, and vinyl chloride analysis was performed on the resin after drying. The results of the experiments of Examples 14–19 are shown in Table III.

TABLE III

STRIPPING SEQUENCE OF STEAM STRIPPING SM-185 AT ATMOSPHERIC PRESSURE

| Example No. | 14 | 15 |
|---|---|---|
| Stripping Vessel | 200-gallon reactor | 200-gallon reactor |
| Stripping Sequence Time, minutes | | |
| 5 | Time 0[a] - 7148 ppm VCM[b] 150° F - steam started | Time 0[a] - 8191 ppm VCM[b] |
| 10 | | |
| 15 | | |
| 20 | | |
| | 210° F - 341 ppm VCM[b] | |
| 25 | | Steam started - 150° F |
| 30 | | |
| 35 | 240° F 7.0 ppm VCM[b] | 215° F - 668 ppm VCM[b] |
| 40 | | |
| 45 | | |
| 50 | <2 ppm VCM[b] - started cooling with vacuum | 205° F - 46 ppm VCM[b] |
| 55 | | Started cooling with vacuum & condenser |
| 60 | | 155° F |
| 65 | | |
| 70 | | 135° F - 18 ppm VCM[b] |
| 75 | | |
| 80 | Cooling with jacket | |
| 85 | | |
| 90 | | |
| 95 | | |
| 100 | | |
| 105 | 120° F - 17 ppm VCM[b] | |
| Stripping Agitation | 50 rpm | 170 rpm |
| Density -before strip | — | — |
| -after strip | 0.56 | 0.53 |
| P.S.D.,[c] % on | | |
| 40 mesh | 0.2 | 0.2 |
| 60 | 3.2 | 6.4 |
| 80 | 8.4 | 13.2 |
| 100 | 19.5 | 28.1 |
| 140 | 29.1 | 13.3 |
| 200 | 32.0 | 33.5 |
| Pan | 9.9 | 6.3 |
| Example No. | 16 | 17 |
| Stripping Vessel | 200-gallon reactor | 200-gallon reactor |
| Stripping Sequence Time, minutes | | |
| 5 | | |
| 10 | | 150° F - 4473 ppm VCM[b] - |

TABLE III-continued

| Time (min) | Column A | Column B |
|---|---|---|
| | | started steam |
| 15 | 150° F - 10197 ppm VCM[b] - steam started | |
| 20 | 150° F | |
| 25 | | |
| 30 | | |
| | 210° F - 269 ppm VCM[b] | 212° F - 159 ppm VCM[b] - vacuum on reactor |
| 35 | | 195° F - vacuum on condenser |
| 40 | 230° F - 57 ppm VCM[b] | |
| 45 | 240° F - started cooling | |
| 50 | | |
| 55 | | |
| 60 | | |
| 65 | 120° F - 17 ppm VCM[b] | 170° F - cooling on jacket |
| 70 | | |
| 75 | | |
| 80 | | |
| 85 | | 120° F - 28 ppm VCM[b] |
| 90 | | |
| 95 | | |
| 100 | | |
| 105 | | |

| | | | |
|---|---|---|---|
| Stripping Agitation | 50 rpm | | 63 rpm |
| Density -before strip | — | 0.52 | |
| -after strip | 0.52 | | 0.55 |

| P.S.D.[c], % on | | | |
|---|---|---|---|
| 40 mesh | 0.3 | 0.3 | 0.2 |
| 60 | 0.9 | 0.9 | 1.1 |
| 80 | 10.8 | 12.4 | 14.0 |
| 100 | 40.2 | 41.2 | 44.4 |
| 140 | 29.3 | 18.3 | 20.9 |
| 200 | 17.0 | 24.9 | 18.4 |
| Pan | 3.1 | 3.1 | 2.0 |

| | | |
|---|---|---|
| Example No. | 18 | 19 |
| Stripping Vessel | 300-gallon slurry tank | 200-gallon reactor |
| Stripping Sequence Time, minutes | | |

| Time (min) | Column A | Column B |
|---|---|---|
| | Time 0[a] - end of ΔP | |
| 5 | 115° F - finish dumping to tank | |
| 10 | 21071 ppm VCM[b] - steam started | |
| 15 | | 150° F - 11735 ppm VCM[b] - started steam |
| 20 | | |
| 25 | | |
| 30 | 212° F - 186 ppm VCM[b] - cooling with water | 212° F - 174 ppm VCM[b] - vacuum on condenser |
| 35 | | |
| 40 | | |
| 45 | | 212° F |
| 50 | 120° F - 366 ppm VCM[b] | |
| 55 | | |
| 60 | | 120° F - 35 ppm VCM[b] |
| 65 | | |
| 70 | | |
| 75 | | |
| 80 | | |
| 85 | | |
| 90 | | |
| 95 | | |
| 100 | | |
| 105 | | |

| | | | | |
|---|---|---|---|---|
| Stripping Agitation | | | 170 rpm | |
| Density -before strip | 0.55 | | 0.56 | |
| -after strip | | 0.56 | | 0.52 |

| P.S.D.[c], % on | | | | |
|---|---|---|---|---|
| 40 mesh | 0.1 | 0.1 | 0.1 | 0.2 |
| 60 | 2.0 | 2.5 | 2.5 | 0.6 |
| 80 | 18.1 | 20.4 | 20.4 | 8.9 |
| 100 | 42.0 | 44.7 | 44.7 | 39.6 |
| 140 | 18.0 | 18.9 | 18.9 | 19.1 |
| 200 | 18.0 | 11.8 | 11.8 | 29.1 |
| Pan | 2.0 | 1.8 | 1.8 | 3.2 |

FOOTNOTES -
[a]Time zero represents the end of vent, except in Example 18, where end of ΔP (pressure drop) was time zero.
[b]VCM concentration is total VCM corrected to dry polymer phase basis.
[c]P.S.D. stands for particle size distribution.

Surprisingly, these data indicate that more than 95 percent of the monomer in the slurry is removed from the SM-185 resin during the heat-up period. This indicates that it may be unnecessary in some applications to continue the addition of live steam for further stripping after the peak heat-up temperature has been reached. Further, the tests show that during the cool back period additional vinyl chloride monomer may be removed from the resin particles. While it is not desirable to be bound by the theory, it is believed that the vinyl chloride monomer diffuses out of the particles rapidly during the heat-up period and is rapidly expelled from the aqueous phase. Thus, it appears that the aqueous phase does not present a significant resistance to the removal of most of the vinyl chloride monomer once the vinyl chloride monomer has been expelled from the resin particles.

From an inspection of the data, it is also apparent that the agitation, i.e., the rate of stirring during the heat-up, stripping and cool back periods, does not significantly affect the efficiency or rate of removal of vinyl chloride monomer from the PVC resin particles, provided the rate is sufficient to maintain suspension of the particles in the slurry.

Analytical determination and product quality testing was done on samples of the PVC of Examples 14–19, and the results of these data are presented in Table IV. From these data, it can be seen that the steam stripping process of this invention can reduce the vinyl chloride monomer content of PVC resin-water slurries by at least 99 percent. Further, it can be seen that the quality of Ethyl SM-185 PVC resin is not significantly reduced, based on the comparison between the planetary dry-up test of the resin in the slurry before stripping compared to the planetary dry-up of the resin after stripping. Surprisingly, these data also show that the sensitivity of the stripped resin to degradation which occurs upon heating (yellowness index) has actually been decreased in the stripped resin. Thus, the process not only produces a resin having a low vinyl chloride monomer content, but, in these instances, produced an unexpected increase in the heat tolerance of the stripped resin.

TABLE IV

ANALYTICAL AND PRODUCT QUALITY DATA ON EXAMPLES 14–19

| Example No. | 14 | 15 | 16 | 17 | 18 | 19 |
|---|---|---|---|---|---|---|
| Before Stripping | | | | | | |
| VCM in slurry, ppm | 2978 | 3850 | 3569 | 1700 | 5900 | 3990 |
| % Solids in slurry | —47.2 | 35.4 | 37.9 | 28.4 | 34.3 | — |
| VCM in PVC, ppm | — | 8156 | 10,081 | 4485 | 20,775 | 11,632 |
| Planetary Dry-up | — | 14.5 | — | 15.5 | 14.0 | — |
| Yellowness Index | — | 14.8 | — | 14.8 | 10.7 | 13.2 |
| Bulk Density, g/cc | 0.56 | 0.53 | 0.52 | 0.55 | 0.52 | |
| Time Zero (212° F) | | | | | | |
| VCM in slurry, ppm | 142 | 241 | 78.3 | 59 | 69 | 66.0 |
| % Solids in slurry | — | 34.9 | 29.4 | 36.5 | 36.6 | 37.8 |
| VCM in PVC, ppm | — | 690 | 266 | 162 | 188 | 174 |
| Planetary Dry-up | — | 14.7 | — | 13.7 | 14.0 | — |
| Yellowness Index | — | 13.2 | — | 12.3 | 11.3 | 14.6 |
| Temperature, °F | 210 | 215 | 210 | 212 | 212 | 212 |
| Third Sample | | | | | | |
| $t_o$ + min. | — | 15 | 10 | — | — | — |
| VCM in slurry, ppm | 2.9 | 16.4 | 13.3 | — | — | — |
| % Solids in slurry | — | 36 | 23.3 | — | — | — |
| VCM in PVC, ppm | — | 45.6 | 57.1 | — | — | — |
| Planetary Dry-up | — | 14.3 | — | — | — | — |
| Yellowness Index | — | 12.6 | — | — | — | — |
| Temperature, °F | 240 | 205 | 230 | — | — | — |
| Fourth Sample | | | | | | |
| $t_o$ + min. | 25 | — | — | — | — | — |
| VCM in slurry, ppm | >2 | — | — | — | — | — |
| % Solids in slurry | — | — | — | — | — | — |
| VCM in PVC, ppm | — | — | — | — | — | — |
| Temperature, °F | 240 | — | — | — | — | — |
| After Stripping | | | | | | |

TABLE IV-continued

ANALYTICAL AND PRODUCT QUALITY DATA ON EXAMPLES 14–19

| Example No. | 14 | 15 | 16 | 17 | 18 | 19 |
|---|---|---|---|---|---|---|
| $t_o$ + min. | 80 | 35 | 35 | 53 | 20 | 32 |
| VCM in slurry, ppm | 7.0 | 7.0 | 5.8 | 10.8 | 15.2 | 14.2 |
| % Solids in slurry | — | 39.5 | 35.4 | 39.4 | 41.4 | 39.6 |
| VCM in PVC, ppm | — | 17.7 | 16.4 | 27.4 | 36.7 | 35.9 |
| Planetary Dry-up | — | 14.5 | — | 15.9 | 15.0 | — |
| Yellowness Index | — | 12.2 | — | 12.0 | 11.9 | 12.4 |
| Bulk Density, g/cc | — | — | — | 0.55 | 0.56 | 0.54 |
| Temperature, °F | 120 | 135 | 120 | 120 | 120 | 120 |

EXAMPLES 20–22

A batch of standard Ethyl SM-160 PVC resin was prepared in a 200-gallon pilot plant autoclave, and the PVC resin-water slurry was subjected to steam stripping in the 200-gallon autoclave after conventional pressure degassing to remove a portion of the unreacted vinyl chloride monomer. Samples of the finished dried resin taken from the polymerization batch before steam stripping, together with a sample of the dried resin taken after steam stripping, are compared with a control resin from the normal Ethyl SM-160 pilot plant material (not subjected to steam stripping) by compounding these three samples into a standard PVC compound formulation. Samples of the three PVC compounds were subjected to a standard heat stability evaluation, and the results of these tests are presented in Table V below.

TABLE V

HEAT STABILITY EVALUATION OF STEAM STRIPPED ETHYL SM-160 RESINS

| Example No. | Run No. | Type of Resin | Color Slope[a] | DTS,[b] min. |
|---|---|---|---|---|
| 20 | 1273 | Control | 0.18 | 35.5 |
| 21 | 1350B | SM-160 before steam strip | 0.18 | 40.0 |
| 22 | 1350A | SM-160 after steam strip | 0.17 | 39.0 |

[a]From plot of yellowness index vs. time at 350° F mill temperature.
[b]Brabender dynamic thermal stability.

In comparing the results of the color slope test on the compounded formulations, it is noted that the compound made from SM-160 resin after steam sripping has the same color slope within experimental error as the compound made from SM-160 before steam stripping and also the standard pilot plant control sample. Analytical tests performed upon the SM-160 PVC resin-water slurry of Example 21 before steam stripping indicated it to contain 13,414 ppm of vinyl chloride monomer. The dried resin after steam stripping was found to contain 285 ppm vinyl chloride monomer, thus effecting a reduction of 97.9 percent in the vinyl chloride monomer content as originally present in the PVC resin-water slurry before steam stripping. Also during these tests, the feasibility of the heat-up time and cool down time was determined in order to determine if the procedure used in these examples was suitable for transfer to a commercial polyvinyl chloride resin plant. Steam injection for 22 minutes raised the temperature of the PVC resin-water slurry to the desired 212° F, and the slurry was held for 4 minutes at that temperature, then immediately cooled to 100° F in 15 minutes. These conditions confirm that the procedure used in this example can be readily adapted for use in a commercial polyvinyl chloride plant since it is consistent with the normal time delay encountered in the polymerization, transferring, and holding the PVC resin-water slurry in storage before taking the slurry into the drying system.

EXAMPLES 23-32

Four batches of Ethyl SF-225 PVC resin and six batches of Ethyl SM-185 PVC resin were prepared in a commercial PVC plant autoclave using standard polymerization procedures. Each of these batches was subsequently steam stripped or treated in a stripping vessel. The equipment utilized to steam strip these resins and to subsequently dry them was substantially the same as that shown in the drawing. Steam was injected into the stripping vessel at a rate of about 15,000 pounds per hour during the heat-up time interval. The PVC-water slurry in the treating vessel was stirred with the paddle stirrer rotating at a rate of 45 rpm. After the PVC resin-water slurry had reached the preselected maximum heat-up temperature, a vacuum was applied to the vapor space of the vessel by the vacuum-condenser system to adiabatically cool back the PVC resin-water slurry as rapidly as possible to the preselected cool back temperature. After the pre-established cool back temperature was reached, the bottom dump valve of the treating vessel was opened, and the steam treated slurry was transferred to the slurry holding tank. The slurry holding tank, containing two or more batches from the steam treating vessel, was subsequently fed to a centrifuge for dewatering and then into a rotary dryer for drying the resin to the finished specification. Stripping conditions for each stripping operation of Examples 23-32 are set forth in Table VI. Additionally, there is presented in this table analytical data of samples taken at various times and places for the measurement of vinyl chloride monomer in the slurry or dried product. Dried resin from certain dryer lot numbers was subjected to quality testing to determine the effectiveness of the steam stripping operation and its effect upon the quality of the finished resin. These data are also presented in Table VI. Additional runs (not shown) were carried out in the commercial plant autoclaves, and samples of the dried resin for six dryer lots were analyzed for vinyl chloride monomer content. These six dried SM-185 resin lots had a vinyl chloride content ranging from a low of 36.9 ppm to a high of 98.8 ppm, the average being 72.4 ppm. Five of these dried resin lots were air mixed in a storage silo and then a portion thereof loaded into a three-hopper resin rail car. Samples were taken from each of the compartments of the rail car after loading and analyzed for vinyl chloride monomer content. Analysis indicated that the first compartment resin contained 49.4 ppm vinyl chloride monomer, the second compartment 44.3 ppm vinyl chloride monomer, and the third compartment 48.4 ppm vinyl chloride monomer.

TABLE VI
COMMERCIAL PVC PLANT STRIPPING TESTS

| Example No. | 23 | 24 | 25 | 26 | 27 | 28 | 29 | 30 | 31 | 32 |
|---|---|---|---|---|---|---|---|---|---|---|
| Resin | SF-225 | SF-225 | SF-225 | SF-225 | SM-185 | SM-185 | SM-185 | SM-185 | SM-185 | SM-185 |
| Batch No. | 8812 | 8817 | 8902 | 8907 | 8915 | 8918 | 8924 | 8926 | 8933 | 8937 |
| VCM in slurry from autoclave, ppm[c] | | | 10,000[d] | | | | | 7,000[d] | | |
| Heat-up temp., °F (max.) | 212 | 212 | 220 | 220 | 215 | 215 | 215 | 220 | 220 | 220 |
| Heat-up time, min. | 27 | 35 | 27.5 | 33 | 19 | 18 | 25 | 28 | 26 | 23 |
| Sampling time, min.[a] | — | — | 5.5 | 5 | — | — | 4 | — | 5[e] | 5 |
| Cool back time, min. | 42 | 53 | 42 | 42 | 35 | 33 | 46 | 40 | 36 | — |
| Transfer time, min. | 12 | 15[e] | 15[e] | 10 | 15[e] | 11 | 14 | 16 | 15[e] | — |
| Total treater time, min.[b] | 107 | 120 | 101 | 95 | 102 | 87 | 109 | 114 | 98 | — |
| VCM in slurry after heat-up, ppm[c] | — | — | 267 | 136 | — | — | 809 | — | 175 | 169 |
| VCM in slurry after cool back, ppm[c] | — | — | 30.6 Control | 26 | — | — | 104 | Control | 33 | 18 |
| VCM in wet cake, ppm[c] | ← | 99.4 | — | 1500[d] | — | 149.4 | → ← 75.4 | — | 2500[d] | — 54.7 → |
| VCM in dry resin product, ppm | ← | <0.5 | — | 40[d] | — | <0.5 | → ← 50.3 | — | 1185[d] | — 28.9 → |
| Dryer Lot No. | ← | 3666 | → | | ← | 3685 | → ← 3687 | → Control Lot 2302 | ← | 3691 → |
| Initial Yellowness Index | (Control +19.4) | ← | | +22.7 | → ← | +9.6 | → | +9.5 | ← | +9.7 → |
| Dynamic Thermal Stability | ← — → | ← | — | | → ← | 23.0 | → | 22.0 | ← 23.0 | → |
| Torque | ← — → | ← | — | | → ← | 290 | → | 280 | ← 280 | → |
| Long-term Color Stability | ← — → | ← | — | | → ← | OK | → | | ← OK | → |

[a] Time between turning on vacuum-condenser and beginning transfer to slurry holding tank.
[b] Includes slack time between various operations.
[c] Corrected to dry resin basis.
[d] Estimated from averages of typical previous batches.
[e] Estimated.

From Examples 23 and 24, it can be seen that, when Ethyl SF-225 resin is subjected to steam treating, the vinyl chloride monomer content originally present in the pressure degassed slurry in the autoclave (10,000 ppm) is reduced to less than 0.5 ppm in the dried resin product. Examples 27-29 of Ethyl SM-185 resin containing 7,000 ppm in the resin-water slurry feed (dry resin basis) before steam treatment produced a dried resin containing 50.3 ppm in the dried resin product. Examples 30-32 of SM-185 resin indicate that the vinyl chloride monomer content of about 7,000 ppm in the resin-water slurry (dry resin basis) prior to treating with steam is reduced to 28.9 ppm vinyl chloride monomer in the dried product. Further, the physical tests performed on the dried PVC product from the steam treatment procedures indicate that the yellowness index in the dry PVC SM-185 resin produced from Examples 25 and 26 had a value identical within experimental error to the yellowness index of PVC SM-185 resin control sample No. 34 finished by the normal procedure without the steam stripping. The yellowness index of the SM-185 batches indicates that there was no increase in the yellowness index of the resin which had been steam treated when compared to the control sample of PVC produced by the normal polymerization and drying procedure. The dynamic thermal stability, torque and long-term color stability of the steam treated samples of SM-185 are shown to be equivalent to those of a control sample of SM-185 produced by conventional non-steam stripping procedures. Further, the data of Example 25 indicate that the adiabatic flash cooling step is effective in removing about 80 to 90 percent of the vinyl chloride monomer that remains in the slurry after the end of the heat-up period.

EXAMPLES 33-40

Two batches of Ethyl SM-250 PVC resin and six batches of Ethyl SM-185 PVC resin were prepared in commercial plant autoclaves using standard polymerization procedures. Each batch was subsequently steam stripped using the same stripping vessel, steam feed rate, stirrer rpm and stripping procedure used in Examples 23-32. Stripping conditions and analytical data on the samples taken are presented in Table VII. As seen in Examples 33 and 34, for Ethyl SM-250 PVC resin the vinyl chloride monomer content of the slurries after cool back, 37.0 and 28.6, respectively, are comparable to those obtained in Examples 25 and 26 for Ethyl SF-225 PVC resin, and thus after being subjected to similar drying conditions would be expected to contain vinyl chloride monomer at about the same level, i.e., less than 0.5 ppm. Examples 35-40 indicate that Ethyl PVC SM-185 resin slurries which contain about 10,000 ppm vinyl chloride monomer in the degassed slurry before stripping have their vinyl chloride monomer levels reduced to between 18 and 67 ppm vinyl chloride monomer by injecting steam into the slurry over about a 30 minute time period to raise the slurry to temperatures between about 218° F to about 225° F and then cooling the slurries by an adiabatic flash for a period of about 40 to 50 minutes. Comparison of Examples 39 and 40 with Examples 33-38 indicates that substantially the same vinyl chloride monomer removal in Ethyl SM-185 PVC resin slurry is achieved by continuing the injection of steam into the slurry for up to 5 minutes after the desired maximum temperature is achieved.

cess is found in that it does not require any increase in the number of operators to staff the polyvinyl chloride plant, and the training of the operators in carrying out the stripping operation is extremely simple.

When considering the well-known fact that polyvinyl chloride resins degrade in quality when exposed to high temperatures for even a reasonably short interval of time, it is indeed surprising that the process of the present invention can be used to steam treat polyvinyl chloride resins without producing any significant deterioration in the quality of the finished resin. As previously pointed out, it appears that, in fact, some of the characteristics of the finished polyvinyl chloride resin in some cases may be improved by subjecting them to the steam treating process of the present invention. The present invention is eminently suitable for treating those PVC resins which are commonly used in preparing PVC compounds that are used in food grade applications such as blow molded or injection molded or thermoformed plastic bottles and containers which are used to package food, drug, or cosmetic products wherein stringent requirements for PVC migration from the bottle to the contents are expected to be effective in a short time. Heretofore, these types of resins have contained, in some cases, as much as 3,000 parts per million vinyl chloride monomer in the resin which is used to prepare the food grade compounds. Indications are that it will be very difficult, if not impossible, for containers made from resins containing these levels of vinyl chloride monomer to pass the proposed specifications for migration of vinyl chloride monomer into the container content. Using the process and the apparatus of the present invention, it has been demonstrated on a commercial scale that the vinyl chloride monomer content of this type resin, e.g., Ethyl SM-185, can be reduced to at least a level of about 30 parts per million in the dried resin. It is believed that subsequent procedures can be employed

TABLE VII

| | COMMERCIAL PVC PLANT STRIPPING TESTS | | | | | | | |
|---|---|---|---|---|---|---|---|---|
| Example No. | 33 | 34 | 35 | 36 | 37 | 38 | 39[b] | 40[b] |
| Resin | SM-250 | SM-250 | SM-185 | SM-185 | SM-185 | SM-185 | SM-185 | SM-185 |
| Batch No. | 9819 | 9828 | 470 | 472 | 498 | 500 | 547 | 551 |
| VCM in slurry from autoclave, ppm[a] | 16,600 | 18,300 | — | 10,500 | 10,300 | — | — | — |
| Heat-up temp., ° F (max.) | 216 | 220 | 225 | 225 | 225 | 225 | 221 | 218 |
| Heat-up time, min. | 45 | 39 | — | 25 | 27 | 24 | 27 | 34 |
| Cool back time, min. | 57 | 45 | 53 | 40 | 45 | 43 | 50 | 50 |
| VCM in slurry after heat-up, ppm[a] | 503 | 562 | 324 | 448 | 369 | — | — | — |
| VCM in slurry after cool back, ppm[a] | 37.0 | 28.6 | 18.0 | 71 | 55 | 49 | 54 | 67 |

[a]Corrected to dry resin basis.
[b]Steam feed continued for 5 minutes after reaching maximum temperature.

From the foregoing, it can be seen that the process and apparatus of the present invention provide a means for efficiently, economically and expeditiously reducing the vinyl chloride monomer content of suspension polyvinyl chloride resin. The process has been shown to be capable of application to the reduction of vinyl chloride monomer content of all of the many different types of polyvinyl chloride suspension resins produced in a commercial polyvinyl chloride plant. The process has advantageous features in that it can be readily adapted to existing polyvinyl chloride plant installations with a minimum of economic investment. In many cases, conventional stirred vessels which are already employed in polyvinyl chloride plants can be adapted according to the present invention to carry out the process of reducing the vinyl chloride monomer by steam treatment of the resin. An additional advantage in the present proin the preparation of the PVC compounds for food grade use which will subsequently reduce the 30 or so parts per million of vinyl chloride monomer in the resin to acceptable levels in the finished compound whereby these compounds may be used to package food grade products and meet the proposed projected specifications for vinyl chloride monomer migration into the package contents.

The capital and operating costs associated with application of this invention are not unduly high. Hence, this invention appears to be a most practical approach to the attainment of the benefits of reduced exposure to vinyl chloride monomer.

The process and apparatus of the present invention provide a further advantage in that they result in far less emission of vinyl chloride monomer to the atmosphere than do previously used processes and apparatuses. By steam treating the PVC slurry prior to placing it in batch or holding tanks, which oftentimes have been opened to the atmosphere, the present process effectively removes not only the vinyl chloride monomer carried in the aqueous phase, but the vinyl chloride monomer which is occluded in the porous PVC particles. The removed monomer is condensed in the vacuum condenser system, and the condensate from this portion of the process can be further treated to recover the vinyl chloride monomer or to destroy it, thus minimizing both atmospheric and surface water pollution from the polyvinyl chloride polymerization process.

In addition, the vinyl chloride monomer concentration in the dryer feed is substantially reduced. A substantial portion of the monomer in the dryer feed is stripped from the polymer in the dryer (30–90 percent depending on particle characteristics). A typical dryer producing 10,000 lb/hr dry product with a feed containing 1000 to 4000 ppm vinyl chloride monomer will emit 9–12 lb/hr vinyl chloride monomer to the atmosphere. This pollutant is highly diluted with the dryer exhaust air and, as a result, no practical pollution abatement operation is available to reduce the vinyl chloride monomer emission rate once the high monomer content wet cake enters the dryer. This invention makes a substantial reduction in the wet cake monomer content and as a result substantially reduces the vinyl chloride monomer emission rate to the atmosphere to rates of less than 1 lb/hr.

While certain embodiments of the invention have been disclosed herein, it is not intended to limit the invention solely to that disclosed. It is readily understood that the process and the apparatus and the conditions of this invention may be varied over considerable limits and that equivalents may be employed without departing from the scope and the spirit of the invention.

What is claimed is:

1. In the method of treating particles of a polyvinyl chloride resin prepared by a suspension process, which resin particles have a susceptibility to a degradation in thermal stability and an increase in bulk density upon prolonged heating and where the particles are contained in an aqueous medium wherein the resin particles and aqueous medium have been subjected to a flashing step to remove a major portion of the unreacted vinyl chloride monomer therefrom, the improvement for further reducing the vinyl chloride monomer content of the resin particles comprising:
   a. placing the resin particles and aqueous medium alone in a closed vessel and agitating the resin particles in the aqueous medium;
   b. directly heating the aqueous suspension of the resin particles by injecting steam herein for a period of time between about 5 minutes and 45 minutes to raise the temperature of the suspension in a range of from about 180° F to about 240° F while simultaneously removing from the vessel a vapor phase containing vinyl chloride monomer and the aqueous medium;
   c. terminating the heating step;
   d. cooling the suspension to a temperature of about 120° F to about 170° F in less than about 1 hour by applying a sufficient vacuum to the vessel to cause vaporization of a portion of said aqueous medium to remove at least about 80% of the vinyl chloride monomer remaining in the resin particles after the completion of step (b); and
   e. whereby treated polyvinyl chloride resin particles are produced having a vinyl chloride monomer content less than about 340 ppm (dry resin basis) and a thermal stability and bulk density not significantly different from the resin particles prior to treating.

2. The method of claim 1 wherein the suspension is heated to the saturation temperature of pure water corresponding to the selected operating pressure.

3. The method of claim 1 wherein steam injection is continued for a period of time after said suspension has reached a temperature of at least about 180° F.

4. The method of claim 1 wherein the suspension polyvinyl chloride resin has a relative viscosity, as measured in cyclohexanone using 0.94 gram of resin in 100 ml of cyclohexane at 25° C, of from about 1.60 to about 2.50.

5. The method of claim 3 wherein said period of time is from about 5 minutes to about 15 minutes.

6. The method of claim 1 wherein the aqueous suspension is heated to a temperature of at least 212° F.

7. The method of claim 1 wherein steam injection is continued for about 10 minutes while maintaining the aqueous suspension at a temperature of about 225° F.

8. The method of claim 1 including the steps of separating the resin particles from the aqueous medium and drying the resin particles.

* * * * *

UNITED STATES PATENT OFFICE
CERTIFICATE OF CORRECTION

PATENT NO. : 4,086,414                                    Page 1 of 3
DATED      : April 25, 1978
INVENTOR(S): Edwin D. Hornbaker et al It is certified that error appears in the above-identified patent and that said Letters Patent are hereby corrected as shown below:

Column 2, lines 58-60, delete "and the water vapor is applied to the vapor space of the vessel,"; Column 3, line 29, reads "the diffusion", should read -- the diffusion rate --; Column 7, line 11, reads "dired", should read -- dried --; Column 7, line 28, reads "proceding", should read -- preceding --; Column 7, line 35, reads "clear", should read -- clean --; Column 7, line 48, reads "minutes", should read -- minute --; Column 9, line 2, "aqueus" should read -- aqueous --; Column 10, line 48, reads "Weight", should read -- Weigh --; Column 12, line 56, reads "could", should read -- should --; Column 15, Table III, delete "0" above "Density" (second occurrence); Columns 19-20, Table VI, reads

TABLE VI
COMMERCIAL PVC PLANT STRIPPING TESTS

| Example No | 23 | 24 | 25 | 26 | 27 | 28 | 29 | 30 | 31 | 32 |
|---|---|---|---|---|---|---|---|---|---|---|
| Resin | SF-225 | SF-225 | SF-225 | SF-225 | SM-185 | SM-185 | SM-185 | SM-185 | SM-185 | SM-185 |
| Batch No. | 8812 | 8817 | 8902 | 8907 | 8915 | 8918 | 8924 | 8926 | 8933 | 8937 |
| VCM in slurry from autoclave, ppm$^c$ | | | 10,000$^d$ | | | | | 7,000$^d$ | | |
| Heat-up temp., °F (max.) | 212 | 212 | 220 | 220 | 215 | 215 | 215 | 220 | 220 | 220 |
| Heat-up time, min | 27 | 35 | 27.5 | 33 | 19 | 18 | 25 | 28 | 26 | 23 |
| Sampling time, min.$^a$ | — | — | 5.5 | 5 | — | — | 4 | — | 5$^e$ | 5 |
| Cool back time, min. | 42 | 53 | 42 | 42 | 35 | 33 | 46 | 40 | 36 | — |
| Transfer time, min | 12 | 15$^e$ | 15$^e$ | 10 | 15$^e$ | 11 | 14 | 16 | 15$^e$ | — |
| Total treater time, min.$^b$ | 107 | 120 | 101 | 95 | 102 | 87 | 109 | 114 | 98 | — |
| VCM in slurry after heat-up, ppm$^c$ | — | — | 267 | 136 | — | — | 809 | — | 175 | 169 |
| VCM in slurry after cool back, ppm$^c$ | — | — | 30.6 | 26 | — | — | 104 | — | 33 | 18 |
| VCM in wet cake, ppm$^c$ | ← | 99.4 | — | 1500$^d$ Control | — | 149.4 →← | 75.4 | — | 2500$^d$ Control | — 54.7 → |
| VCM in dry resin product, ppm | ← | <0.5 | — | 40$^d$ | — | <0.5 →← | 50.3 | — | 1185$^d$ | — 28.9 → |
| Dryer Lot No. | ← | 3666 | → | | ← | 3685 →← | 3687 | — Control Lot 2302 | ← | 3691 → |
| Initial Yellowness Index | (Control + 19.4) | | ← | +22.7 | →← | +9.6 | → | +9.5 | ← +9.7 | → |
| Dynamic Thermal Stability | ←——→ | | ← | — | →← | 23.0 | → | 22.0 | ← 23.0 | → |
| Torque | ←——→ | | ← | — | →← | 290 | → | 280 | ← 280 | → |
| Long-term Color Stability | ←——→ | | ← | — | →← | OK | → | | ← OK | → |

$^a$Time between turning on vacuum-condenser and beginning transfer to slurry holding tank.
$^b$Includes slack time between various operations
$^c$Corrected to dry resin basis
$^d$Estimated from averages of typical previous batches.
$^e$Estimated

UNITED STATES PATENT OFFICE
CERTIFICATE OF CORRECTION

PATENT NO. : 4,086,414
DATED : April 25, 1978
INVENTOR(S) : Edwin D. Hornbaker et al It is certified that error appears in the above-identified patent and that said Letters Patent are hereby corrected as shown below:

should read

TABLE VI

COMMERCIAL PVC PLANT STRIPPING TESTS

| Example No. | 23 | 24 | 25 | 26 | 27 | 28 | 29 | 30 | 31 | 32 |
|---|---|---|---|---|---|---|---|---|---|---|
| Resin | SF-225 | SF-225 | SF-225 | SF-225 | SM-185 | SM-185 | SM-185 | SM-185 | SM-185 | SM-185 |
| Batch No. | 8812 | 8817 | 8902 | 8907 | 8915 | 8918 | 8924 | 8926 | 8933 | 8937 |
| VCM in slurry from autoclave, ppm[c] | ←——— 10,000[d] ———→ | | | | ←——— 7,000[d] ———————————————→ | | | | | |
| Heat-up temp., °F (max.) | 212 | 212 | 220 | 220 | 215 | 215 | 215 | 220 | 220 | 220 |
| Heat-up time, min. | 27 | 35 | 27.5 | 33 | 19 | 18 | 25 | 28 | 26 | 23 |
| Sampling time, min.[a] | - | - | 5.5 | 5 | - | - | 4 | - | 5[e] | 5 |
| Cool back time, min. | 42 | 53 | 42 | 42 | 35 | 33 | 46 | 40 | 36 | - |
| Transfer time, min. | 12 | 15[e] | 15[e] | 10 | 15[e] | 11 | 14 | 16 | 15[e] | - |
| Total treater time, min.[b] | 107 | 120 | 101 | 95 | 102 | 87 | 109 | 114 | 98 | - |
| VCM in slurry after heat-up, ppm[c] | - | - | 267 | 136 | - | - | 809 | - | 175 | 169 |
| VCM in slurry after cool back, ppm[c] | - | - | 30.6 | 26 | - | - | 104 | - | 33 | 18 |
| VCM in wet cake, ppm[c] | ←— 99.4 —→ | Control 1500[d] | ←— 149.4 —→ | | ←——— 75.4 ———→ | | Control 2500[d] | ←——— 54.7 ———→ | | |
| VCM in dry resin product, ppm | ←— <0.5 —→ | 40[d] | ←— <0.5 —→ | | ←——— 50.3 ———→ | | 1185[d] | ←——— 28.9 ———→ | | |
| Dryer Lot No. | ←——— 3666 ———→ | | ←——— 3685 ———→ | | ←——— 3687 ———→ | | | ←——— 3691 ———→ | | |
| Initial Yellowness Index | (Control +19.4) | ←——— +22.7 ———→ | | | ←——— +9.6 ———→ | | Control Lot 2302 +9.5 | ←——— +9.7 ———→ | | |
| Dynamic Thermal Stability | ←——— - ———→ | | ←——— - ———→ | | ←——— 23.0 ———→ | | 22.0 | ←——— 23.0 ———→ | | |
| Torque | ←——— - ———→ | | ←——— - ———→ | | ←——— 290 ———→ | | 280 | ←——— 280 ———→ | | |
| Long-term Color Stability | ←——— - ———→ | | ←——— - ———→ | | ←——— OK ———→ | | | ←——— OK ———→ | | | a. Time between turning on vacuum-condenser and beginning transfer to slurry holding tank.
b. Includes slack time between various operations.
c. Corrected to dry resin basis.
d. Estimated from averages of typical previous batches.
e. Estimated.

UNITED STATES PATENT OFFICE
CERTIFICATE OF CORRECTION

PATENT NO. : 4,086,414
DATED : April 25, 1978
INVENTOR(S) : Edwin D. Hornbaker et al It is certified that error appears in the above-identified patent and that said Letters Patent are hereby corrected as shown below:

Column 24, line 7, reads "herein", should read -- therein --;
Column 24, line 24, reads "340 ppm", should read -- 300 ppm --.

Signed and Sealed this

Seventh Day of November 1978

[SEAL]

Attest:

RUTH C. MASON
Attesting Officer

DONALD W. BANNER
Commissioner of Patents and Trademarks